April 28, 1964
H. S. JONES
3,131,091
SPRAY GUN HAVING MEANS TO CONTROL HEAT
CONCENTRATION IN METAL SUBSTRATE
Filed March 8, 1960
2 Sheets-Sheet 2
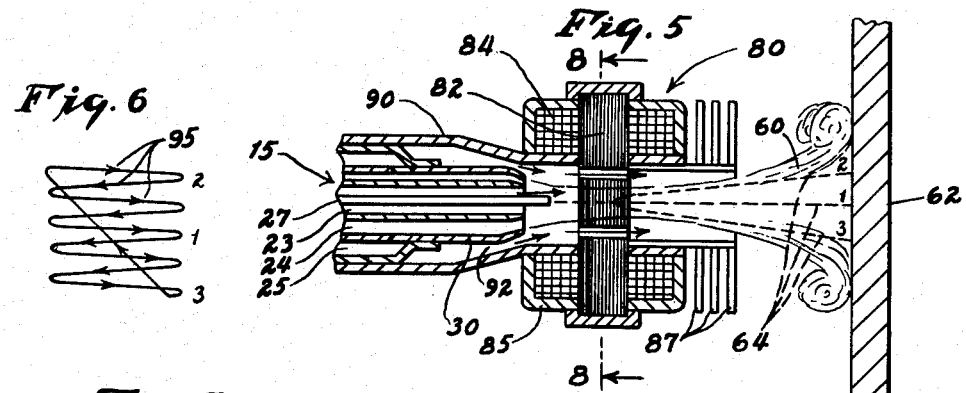
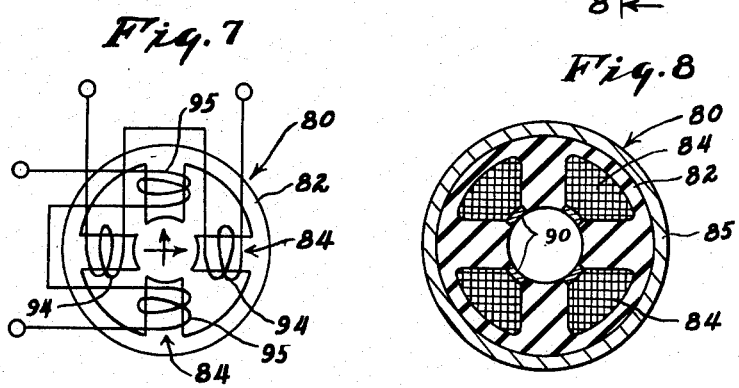
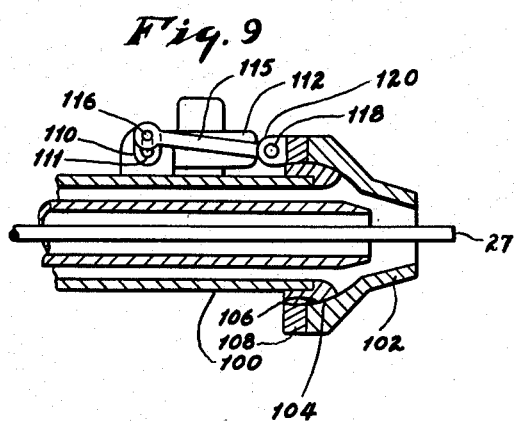
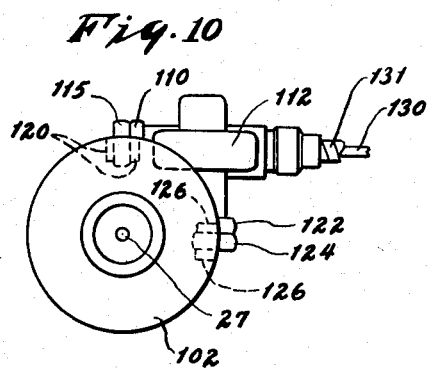
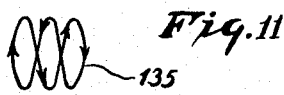
INVENTOR.
HARRY S. JONES
BY Emery Varney
Whittemore & Dix
ATTORNEYS though in some cases compressed air will be satisfactory.

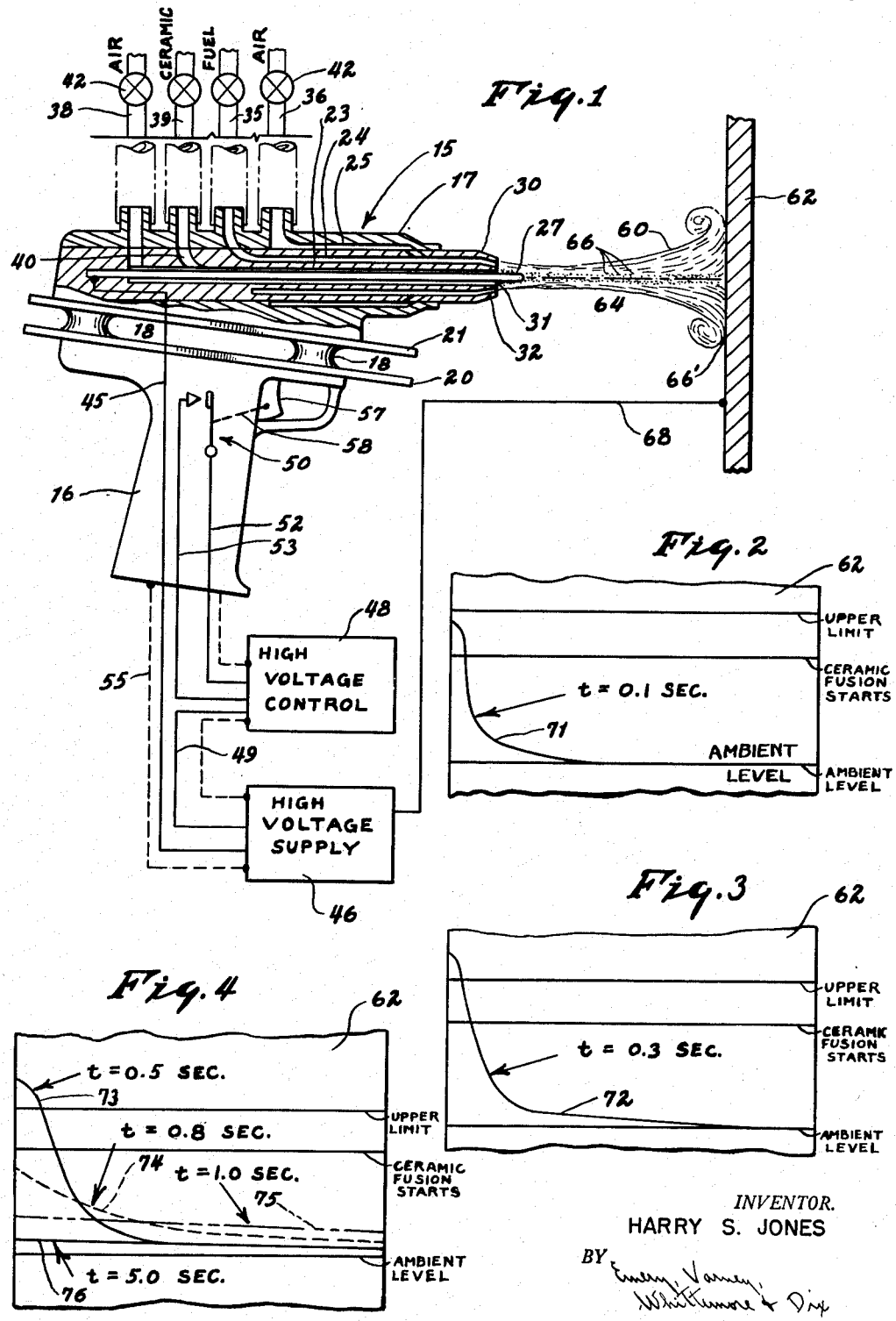

United States Patent Office
3,131,091
Patented Apr. 28, 1964

3,131,091
SPRAY GUN HAVING MEANS TO CONTROL HEAT CONCENTRATION IN METAL SUBSTRATE
Harry S. Jones, 95 Washington St., East Orange, N.J.
Filed Mar. 8, 1960, Ser. No. 13,613
6 Claims. (Cl. 118—47)

This invention relates to the coating of metal work pieces and more especially to the fusing of ceramic coatings on metal surfaces.

More especially the invention is concerned with the application of a fused powder coating to a metal work piece and to doing so with a minimum amount of heating of the work piece. One of the principal difficulties in applying fused coatings to metal has been that the metal is damaged or the work piece distorted by the heat required to fuse the powder. Although the invention will be described in connection with the application of ceramic coatings for which it is especially useful, it should be understood that the invention can be used for metals, alloys, glazes, semi-metals, and some other materials.

Another object of this invention is to provide an improved method and apparatus for applying a fused coating to a metal work piece, and to limit the intense heating of the metal to the skin of the work piece in order to avoid deterioration or distortion of the underlying metal of the work piece.

It is another object of the invention to provide a method and apparatus for producing intense heating of a metal surface so quickly that fusion temperatures for ceramic powder are obtained before any substantial temperature rise take place below the surface metal. In the preferred embodiment of the invention, this intense heating is obtained by means of a pilot flame and an electric arc which is directed toward the work piece along the ionized stream produced by the pilot flame. The heat may be obtained in other ways, such as the electric discharges now known as "plasma jets."

Another object of the invention is to provide means for automatically and quickly shifting the heating stream transversely of its direction of flow to change the locations at which the stream impinges on the work piece. This can be done by means of a mechanical deflector which changes the direction of flow of the pilot flame with respect to the torch from which the flame is discharged. When done in this manner, the direction of the arc is also changed because the arc follows the ionized stream created by the pilot flame.

Transverse shifting of the pilot flame and arc is also obtained by electrical deflecting means; for example, one or more coils that set up electrically-charged fields which can be varied to deflect the heating streams and to change the amount of deflection. The term "electrically-charged fields" is used herein to designate either electro-static or electro-magnetic fields through which the heating streams pass.

In the most elaborate embodiment of the invention, two different deflecting coils are used which operate to bend the path of the heating streams in directions at right angles to one another; and the current flowing in these coils is varied in such relation that one coil shifts the stream back and forth within a limited range while the other coil produces a progressive shift in the line along which the first coil moves the streams back and forth. This causes the streams to traverse an area of the work piece surface, the scanning of the area being analagous to the operation of the cathode ray on a television receiver screen.

This application is a continuation-in-part of my application Serial No. 540,400, filed October 14, 1955, and now abandoned.

Other objects, features and advantages of the invention will appear or be pointed out as the specification proceeds.

In the drawing, forming a part hereof, in which like reference characters indicate corresponding parts in all the views;

FIGURE 1 is a side elevation, partly in section and partly diagrammatic, showing a torch from which a pilot flame and electric arc are directed against a work piece, and showing means whereby a stream of powered ceramic material is fed into the heating stream and discharged against the work piece surface to be coated;

FIGURES 2, 3 and 4 are charts illustrating the principle upon which this invention operates;

FIGURE 5 is a diagrammatic sectional view showing one form of control apparatus for traversing the heating stream back and forth on the work piece surface so as effectively to obtain extremely short heating periods;

FIGURE 6 is a diagram illustrating the way in which deflecting of forces at right angles to one another cause the heating stream to scan an area of the work piece surface;

FIGURE 7 is a wiring diagram for the deflection apparatus shown in FIGURE 5;

FIGURE 8 is a sectional view taken on the line 8—8 of FIGURE 5;

FIGURE 9 is a sectional view showing a modified construction of the heating torch with mechanical means for deflecting the pilot flame;

FIGURE 10 is a front view of the apparatus shown in FIGURE 9, and

FIGURE 11 is a diagram showing the way in which the point of impingement of the heating stream varies when deflected by the apparatus shown in FIGURES 9 and 10.

FIGURE 1 shows a torch 15 having a handle 16 and a duct housing 17. The handle 16 is insulated from the housing 17, which carries high voltage, by insulating blocks 18 connected to plates 20 and 21. The plate 20 is secured to the upper part of the handle 16; and the plate 21 is secured to the lower part of the duct housing 17. The electrical insulating blocks 18 also serve to retard heat flow from the housing 17 to the handle 16.

Within the housing 17 there is a central duct 23 surrounded by two annular ducts 24 and 25 which are preferably concentric with the central duct 23. An electrode 27 extends lengthwise along the central duct 23 and is of a substantially smaller diameter than the central duct so as to avoid obstructing the entire cross section of the duct 23.

In the construction illustrated, the torch 15 has a nozzle 30 with a center passage 31 and a flame jet outlet 32 which may be an annular passage or a circle of individual openings as commonly used for the oxy-acetylene heating flames of a conventional oxygen cutting torch. The electrode 27 extends for a short distance beyond the end of the nozzle 30.

It will be understood that in torches of this type the nozzle 30 is generally a separate piece from the housing 17, but in the construction of FIGURE 1 the tip or nozzle 30 has not been shown as a separate piece and the drawing has been made diagrammatc and simplified; but it will be understood that the tip or nozzle 30 may be a separate piece connected with the housing 17 by any suitable conventional construction.

In the torch, the passages 24 and 25 come together at the upstream end of the flame jet outlet 32 so that fuel gas and a combustion-supporting gas are mixed together before their discharge from the flame jet outlet 32. The fuel gas is generally a hydrocarbon, and acetylene is the most readily available fuel gas for producing intensely hot flame. The combustion-supporting gas may be air or oxygen-enriched air, or it may be commercially pure oxygen.

The fuel gas is supplied to the passage 24 through flexible tubing 35 connected to a fitting at the top of the torch housing 17; and the combustion-supporting gas is supplied to the passage 25 through flexible tubing 36 attached to another fitting at the top of the torch housing 17. The tubings 35 and 36 are preferably plastic or rubber so that they also serve to insulate the torch from the supply sources of the fuel and combustion-supporting gas.

Compressed gas, preferably air, is supplied to the central passage 23 through tubing 38 connected with a fitting of the housing 17; and powdered ceramic material is also supplied to the central passage 23 from tubing 39 which connects with another fitting of the housing 17. As in the case of the tubings 35 and 36, the tubings 38 and 39 are preferably plastic or rubber so as to insulate the torch.

The powdered ceramic material from the tubing 39 enters the central passage 23 through a passage 40 extending at an angle to the passage 23 so that the flow of compressed gas from the tubing 38 through the passage 23 produces an aspirator action for drawing powdered material from the passage 40 and for making the flow of powdered ceramic material at least partially proportional to the rate of flow of compressed gas from the tubing 38 through the central passage 23. Each of the tubings 35, 36, 38 and 39 is provided with a valve 42 for regulating the gas flow.

The electrode 27 is connected with the housing 17 at a location beyond the passage 40 and preferably beyond the end of the central passage 23 so that electrode 27 does not produce a change in the cross section of the passage 23 at any place along the length of the passage. Electric current for the electrode 27 is supplied to the electrode through a conductor 45 leading to a high voltage supply source 46.

The operation of the high voltage supply source 46 is regulated by a current and voltage controller 48 connected to the source 46 by a conductor 49. A trigger switch 50, located in the handle 16 of the torch 15, operates the current and voltage controller 48 and is connected with the controller by conductors 52 and 53. In the illustrated construction, the conductors 45, 49, 52 and 53 are enclosed in a cable having a grounded shield 55. The switch 50 is operated by a trigger 57 through a link 58, and the switch has a spring bias urging it to open.

The trigger switch 50 provides a convenient and instant control of the high voltage current supply through a low voltage circuit and controller. This control may be accomplished by various means ranging from the simple interruption of the primary circuit of a high voltage transformer to elaborate electronic means as will be understood by those skilled in the art. The structure illustrated is merely representative of means for supplying high voltage for an electric arc in accordance with the manipulation of a manually-actuated switch under the control of the operator who is using the torch 15.

As the fuel gas mixture is discharged from the flame jet outlet 32, it burns to produce a pilot flame 60 which impinges upon a work piece 62 to which a coating is to be applied. An electric arc is discharged from the electrode 27 to the work piece 62 and is indicated by the dot-and-dash lines designated by the reference character 64. A stream of powdered ceramic material is shown in the pilot flame 60 by stippling and is indicated by the reference character 66.

During the passage of this powder stream 66 through the pilot flame 60 and arc 64, the particles of ceramic material are fused or partially fused so that when the particles strike the highly-heated work piece surface they become completely molten and are bonded to the surface of the work piece 62 to produce a coating 66'. The work piece is in the arc circuit as shown diagrammatically by the conductor 68, which serves as the ground connection for the torch circuit.

With hydrocarbon fuel gas flames supported by oxygen, the combustion takes place in two stages and the greatest liberation of heat results from the first stage of combustion which produces the primary combustion flame; a flame which is concentrated and stable, and which is surrounded by the envelope flames in which the second stage of combustion takes place. These latter flames are voluminous and billowing flames which spread over the surface of the work piece 62 but produce comparatively little heating.

In the use of the torch 15, therefore, the nozzle 30 is preferably spaced from the work piece 62 so that the concentrated heat of the primary combustion cone, together with the heat of the arc, are concentrated on a very small area of the work piece 62 at any one time. This produces an extremely rapid rise in temperature of the surface metal of the work piece above the fusing temperature of the ceramic material so that highly-heated ceramic particles not yet molten, during their passage along the flame and arc, become completely molten when they come in contact with the highly-heated surface of the work piece, as previously explained.

When the heat of the arc is sufficient, a very thin and feeble flame can be used to serve only as an ionized path for arc-piloting and for powder transfer.

The important feature of the invention is that the fusing of the ceramic to the work piece surface is performed so quickly and with such intense heat that there is insufficient time for heat to soak into the underlying metal by conduction. The operator moves the torch and applies a narrow band of ceramic material in the direction in which the torch is moved.

The preferred characteristic of the high voltage current supply for the arc is the establishment of a very high initial voltage at the instant that the trigger switch is operated to establish the arc. This initial voltage may range from five thousand to fifty thousand volts, after which an automatic current-limiting control action follows to maintain a constant power dissipation through the high voltage circuit. Such control characteristics insure adequately high voltage to initiate the arc and subsequent limitation of the arc circuit current or power in order to avoid power supply overload and irregular heating by the arc.

The pilot flame can be ignited by bringing the arc electrode 27 close to the work piece 62 so that the striking of the arc ignites the fuel gas mixture. Upon ignition of the flame, the torch and electrode tip are moved to several inches away from the work piece 62 and the arc follows the path maintained by ions generated by the pilot flame.

The separate air supply from the tubing 38, which serves as the vehicle for bringing the powdered ceramic material to the flame, and projecting it against the work piece, serves as a supply for part of the oxygen for supporting the combustion of the pilot flame.

FIGURES 2, 3 and 4 show graphically the temperature changes and heat penetration at very short time intervals after the arc and pilot flame initially strike a region on the front, or left-hand side, of the work piece 62.

In these charts, a lower line represents the ambient temperature level which is the temperature of the work piece before any heat is applied by the arc and pilot flame. Another horizontal line marked with the legend "ceramic fusion starts" represents the temperature at which fusion of the ceramic material begins; and the top horizontal line on the charts, marked with the legend "upper limit" represents the highest temperature to which the work piece can be heated without some adverse effect upon the metal of the work piece, such as warping, upsetting, or changes in the physio-chemical composition of the work piece, especially when working with stainless steels.

FIGURE 2 shows a graph line 71 which represents the temperature gradient across the thickness of the work piece 62, after the heat of arc and pilot flame has been applied to the left-hand surface of the work piece 62 for a period of 0.1 second. It is evident that only a thin layer of the metal is significantly raised in temperature while the opposite side of the plate has not yet changed in temperature.

FIGURE 3 is a graph similar to FIGURE 2, but with a graph line 72 which represents the temperature gradient through the thickness of the work piece 62 after the heating by the arc and pilot flame has continued for 0.3 second. Only a thin layer of the work piece surface is raised above the upper limit temperature at which undesired changes occur in a steel plate, while the main bulk of the work piece and the opposite side have not become heated to any significant amount. Sufficient temperature rise has taken place at and near the surface of the steel work piece to permit ceramic particles to be fused upon it.

FIGURE 4 is another graph, similar to FIGURES 2 and 3 with a graph line 73 showing the temperature gradient in the work piece 62 and after the pilot flame and arc have been applied to the left-hand surface of the work piece for a period of 0.5 second. This line 73 shows that if the high temperature heat source is removed after 0.5 second, only moderate heating occurs throughout the bulk of the steel work piece while temperature rise in the plate beyond the upper limit is restricted to less than 10% of the thickness of the work piece. After removal of the heat source, the maximum temperature drops immediately, and after 0.8 second, has fallen to a much lower value and is distributed more uniformly throughout the plate as indicated by the graph line 74.

The depth to which heat above the upper limit penetrates the work piece depends upon heat intensity, size of flame, and the amount of powder to be fused. This depth, in terms of percentage of the total thickness of the work piece, varies with the thickness since the fusion heat for the coating is substantially fixed regardless of the thickness of the underlying metal.

Since in practice, the fusing of the coating material requires a flame temperature substantially higher than the upper limit temperature of the work piece, it is inevitable that the metal face, to which the coating is applied, is heated above the upper limit. Ideally, the metal heated above the upper limit is a "skin" or molecular layer, but usually the metal is heated above the upper limit for a maximum distance up to one-third of the total thickness of the work piece. By restricting heating time this limit can be maintained and most of the thickness of the work piece remains unimpaired by the coating procedure.

Referring again to FIGURE 4, it will be observed that after a full second, the temperature rise is almost equally distributed throughout the thickness of the work piece 62, as illustrated by the graph line 75, but all temperatures are substantially below the upper limit. After five seconds, the temperature in the work piece approaches its original ambient temperature as indicated by the graph line 76.

As illustrated in these graphs in FIGURES 3, 4 and 5, at no time does the temperature of the work piece rise above the desirable upper limit with the exception of a small portion less than one-third of the thickness, and preferably less than ten percent of the work piece thickness on the heated side. While the time values and limits illustrated in FIGURES 2, 3 and 4 will vary with different thicknesses of the work piece and with different materials, the general behavior indicated will always occur.

FIGURE 5 shows an electro-magnetic head 80 for causing sweep motions of the electric arc 64 within and close to the pilot flame 60, and for causing a more limited sweep action of the ionized pilot flame itself. The head 80 includes an iron core 82 and windings 84 through which current flows to set up the electro-magnetic field. A protecting casing 85 surrounds the core 82 and the windings 84; and there are heat baffles 87 between the casing 85 and the exposed pilot flame 60 and arc 64 where they strike the work piece 62. These heat baffles 87 protect the casing 85 and its contents from overheating by radiant heat from the exposed portions of the flame, arc and work piece.

The electro-magnetic head 80 is carried on a supporting sleeve 90 which fits over the nozzle end of the torch 15, and at one end this sleeve 90 is somewhat larger in diameter than the nozzle 30 so as to leave a passage 92 through which cooling air is fed between the electro-magnetic head 80 and the pilot flame and arc for preventing excessive heating of the windings 84 and the pole faces of the iron cord 82.

The ions within the arc are deflected when moving through a magnetic field perpendicular to the arc and flame direction. Since the current flow in the arc will usually be greater in one direction than the other, because of the partial rectifying of the current by the electron path of the pilot flame, the arc will move in one direction in a manner similar to the electron beam on a cathode ray tube. However, with an alternating current arc which is not fully rectified by the pilot flame, the oppositely-charged ions will cause some portions of the arc to move in the opposite direction in response to the electro-magnetic field and tend to form a line of arc contact with the metal plate perpendicular to the magnetic field direction.

The sweep of the arc 64, in one direction, is indicated by the different dotted lines 64 in FIGURE 5. A sweep pattern in which the successive sweeps of the arc 64 are along lines which are progressively displaced in accordance with a simple television type raster is illustrated in FIGURE 6. The direction of sweep of the arc, with each successive sweep, is indicated by a different arrow head 95 and each sweep is progressively lower so that the raster covers an area of the work piece surface. Other raster patterns can be employed by merely changing the control of the field.

FIGURE 7 shows the way in which the windings 84 are located on the pole pieces of the core 84 so as to provide fast and slow sweep motions which are mutually perpendicular so as to produce the area of arc contact illustrated in FIGURE 6. Two coils 94 control the sweep of the arc in one direction and two coils 95 control the sweep of the arc in the other direction. By having a slow sweep from one pair of coils and a faster sweep from the other pair of coils, the raster shown in FIGURE 6 is obtained.

FIGURES 9 and 10 show apparatus for obtaining a sweep of the arc and pilot flame by mechanical means in contrast to the electro-magnetic means illustrated in FIGURES 5–8. A modified nozzle 100, which corresponds to the nozzle 30 of the preferred embodiment of the invention, has a deflector 102 attached to its forward end by a ball-and-socket bearing connection. This ball-and-socket bearing connection includes a zone bearing 104 secured to the discharge end of the nozzle 100 and a complementary concave bearing 106 formed on the deflector 102 and on a retaining ring 108 which forms a part of the deflector structure.

The deflector 102 is oscillated on its bearing 104 by cranks. There are two cranks. The first crank 110 is secured to a shaft 111 which is rotated by gearing in a transmission unit 112 secured to one side of the torch. The crank 110 is connected to the deflector 102 by a connecting rod 115. This connecting rod is joined to the crank 110 by a crank pin 116; and is connected to the deflector 102 by a pivot 118 extending between lugs 120 at the back of the deflector.

FIGURE 10 shows a second crank 122 connected to the deflector 102 by a connecting rod 124 which extends between lugs 126 corresponding to the lugs 120 shown in FIGURE 9, but located at 90° around the periphery of the deflector 102 from the lugs 120. The crank 122 is secured to a shaft extending from the transmission 112. Driving power for the transmission is supplied by a flexible cable 130 extending through a flexible sleeve 131. Power is supplied to the flexible cable 130 from a motor located at some distance from the torch so as not to add the weight of the motor to the torch.

When the deflector sleeve 102 is oscillated on its ball-and-socket bearing connection to the torch, it mechanically deflects the flow of the burning gases of the pilot flame and thereby displaces the ionized path along which the arc travels. Thus the mechanical deflection of the flame also serves to deflect the arc. By rotating the cranks 110 and 122 at different speeds, for example, with a speed ratio of three-to-one, the deflector 102 will cause the flame to describe a scan pattern as indicated by the line 135 in FIGURE 11. The transmission 112 (FIGURES 9 and 10) can be constructed with gearing which will produce any desired ratio of speed between the different rotating cranks 110 and 122.

The preferred embodiment of the invention and some modifications have been illustrated and described, but other changes and modifications can be made, and some features can be used in different combinations without departing from the invention as defined in the claims.

What is claimed is:

1. Apparatus for applying a fused powder coating to a metal surface including in combination a torch that delivers a pilot flame toward the surface of a workpiece to be coated, means directing an electric arc along the ionized path provided by the pilot flame, means for introducing a supply of powdered coating material into the pilot flame in position to be fused by the pilot flame and arc, said pilot flame and arc being concentrated on a small area of the workpiece to produce intense skin heating of the workpiece at that area, and means located at the end of the torch and along the path of the pilot flame as it travels toward the workpiece, said last recited means being operable for progressively changing the path of the pilot flame with respect to the torch so as to strike the workpiece at different areas.

2. The apparatus described in claim 1 and in which the means for deflecting the flame and arc includes devices that produce two magnetic fields, and the means for deflecting the flame and arc vary the characteristics of the fields with respect to one another to produce both horizontal and vertical components of deflection of the flame and arc.

3. The apparatus described in claim 1 with mechanical means on the torch operable to deflect the pilot flame through different and changing angles with respect to the surface toward which the pilot flame is directed, whereby the arc is also deflected by changes in the direction of the ionized stream within the pilot flame.

4. The apparatus described in claim 1 and in which the torch has electric charge producing means for deflecting the stream of gas which forms the pilot flame.

5. Apparatus for supplying a fused powder coating to a metal surface including in combination a high-intensity heating torch having a nozzle, a mixing chamber up stream from the nozzle, means for supplying oxygen and fuel gas to the mixing chamber for discharge from the torch as a flame, means for supplying a stream of powdered coating material to the flame in position to be carried by the flame into contact with a workpiece toward which the flame is directed, an electrode that delivers an electric arc toward the surface of the workpiece along the ionized path created by the flame, means for deflecting both the flame and arc by bending their paths to make them strike the workpiece at new locations, the deflecting means including a coil that produces an electric field, and means for varying the current flow in the coil to change the deflection of the flame and arc.

6. The apparatus described in claim 5 and in which there are two coils producing separate fields in positions substantially at right angles to one another, and means for varying the current flowing in the different coils in timed relation to one another so as to move the area of impingement of the flame and arc on the workpiece back and forth along a line which is displaced progressively in a transverse direction to scan an area of the workpiece surface.

References Cited in the file of this patent
UNITED STATES PATENTS

| | | |
|---|---|---|
| 1,792,243 | Richter | Feb. 10, 1931 |
| 2,460,545 | Spreng | Feb. 1, 1949 |
| 2,592,414 | Gibson | Apr. 8, 1952 |
| 2,754,225 | Gfeller | July 10, 1956 |
| 2,848,349 | Rechter et al. | Aug. 19, 1958 |
| 2,976,166 | White et al. | Mar. 21, 1961 |